(12) United States Patent
Hiranuma

(10) Patent No.: US 7,936,485 B2
(45) Date of Patent: May 3, 2011

(54) IMAGE READING APPARATUS, IMAGE PROCESSING APPARATUS, AND COMPUTER PROGRAM PRODUCT

(75) Inventor: Masahiro Hiranuma, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1130 days.

(21) Appl. No.: 11/562,235

(22) Filed: Nov. 21, 2006

(65) Prior Publication Data

US 2007/0127091 A1    Jun. 7, 2007

(30) Foreign Application Priority Data

Nov. 29, 2005 (JP) ................................. 2005-344116
Sep. 27, 2006 (JP) ................................. 2006-262974

(51) Int. Cl.
  *H04N 1/40* (2006.01)
(52) U.S. Cl. ................... 358/445; 358/1.1; 358/3.23
(58) Field of Classification Search .......... 358/1.1–3.27, 358/501–509
  See application file for complete search history.

(56) References Cited

U.S. PATENT DOCUMENTS

| | | | |
|---|---|---|---|
| 2002/0140844 A1* | 10/2002 | Kurokawa et al. | 348/362 |
| 2004/0183933 A1* | 9/2004 | Nasu | 348/308 |

FOREIGN PATENT DOCUMENTS

| | | |
|---|---|---|
| JP | 4-320159 | 11/1992 |
| JP | 10-210282 | 8/1998 |
| JP | 2002-57899 | 2/2002 |
| JP | 2002-171413 | 6/2002 |
| JP | 2004-312551 | 11/2004 |
| JP | 3778402 | 3/2006 |
| JP | 3828296 | 7/2006 |

OTHER PUBLICATIONS

Machine English Translation of JP Publication No. 2005-333333, Inventor Wada Shinichiro.*

* cited by examiner

*Primary Examiner* — Benny Q Tieu
*Assistant Examiner* — Marcellus Augustin
(74) *Attorney, Agent, or Firm* — Oblon, Spivak, McClelland, Maier & Neustadt, L.L.P.

(57) ABSTRACT

An image reading apparatus includes a clamp-ratio controlling unit configured to change at least one of a clamp period and a line period for each read operation mode, wherein the clamp-ratio setting unit provides a control so that a clamp ratio that is a ratio between the clamp period and the line period is constant through all read operation modes. The clamp period is a period for performing clamp processing for setting a black level to a constant, which is an absolute black reference of an analog image signal output according to a quantity of light at a time of receiving reflected light from a document, and the line period is a read period of one line in the sub scanning direction.

13 Claims, 8 Drawing Sheets

IMAGE READING APPARATUS, IMAGE PROCESSING APPARATUS, AND COMPUTER PROGRAM PRODUCT

CROSS-REFERENCE TO RELATED APPLICATIONS

The present document incorporates by reference the entire contents of Japanese priority document, 2005-344116 filed in Japan on Nov. 29, 2005 and 2006-262974 filed in Japan on Sep. 27, 2006.

BACKGROUND OF THE INVENTION

1. Field of the Invention

The present invention relates to an image reading apparatus, an image processing apparatus, and a computer program product.

2. Description of the Related Art

In an image reading apparatus that converts light to an electric analog image signal by an image sensor such as a charge-coupled device (CCD) to read an image, an analog image signal obtained by converting incident light from a preset reference original image (a white reference board, a black reference board, and the like) to the electric analog image signal is subjected to signal processing such as gain processing and clamp processing (offset processing), thereby obtaining an image signal having a preset strength (for example, see Japanese Patent Application Laid-Open No. H04-320159). This will be described in detail below, taking an example of the clamp processing.

The clamp processing is performed by a clamp circuit 100 as shown in FIG. 11, during a black pixel output period of the analog image signal output from the CCD. In the black pixel output period, a photoelectric transducer in the CCD is shaded, and hence even if the light (a reflected light from a document) comes in, an output level does not change. The output from the CCD during the black pixel output period is referred to as a "black level" as an absolute black reference. In other words, the clamp circuit 100 fixes the black level by keeping potential during one line constant, to take a black level correction process with respect to the output from the CCD during the black pixel output period, based on the black level. More specifically, as shown in FIG. 11, when a clamp pulse (a clamp signal) is input (asserted), and a switch SW 102 is turned ON, an offset level Vin corresponding to the image signal output from the CCD is set as a clamp level Vclp in a clamp level unit 101. In other words, the offset level Vin of an image signal output from the CCD is set to the clamp level Vclp in the lamp level unit 101, thereby keeping the potential constant.

In the clamp circuit 100, however, the value of the clamp level Vclp may not be set to the offset level Vin due to some factors such as an on-resistance of the switch SW 102, and a leak current between an inside of an analog front end (AFE) IC into which the image signal flows and a pad. In this case, a potential difference ΔV is generated between the clamp level Vclp and the offset level Vin.

Such a potential difference ΔV changes according to a read operation mode, when a read period of one line in a sub scanning direction is set to a different value for each read operation mode such as color and monochrome. Further, when a clamp period, which is an input period of a clamp pulse, is set to a different value for each read operation mode such as color and monochrome, the potential difference ΔV changes according to the read operation mode. The change of the potential difference ΔV with the change of the read operation mode causes a change of the offset level of the image signal output from the CCD, when the read operation mode is changed. Since the black level of the image signal output from the CCD is determined by the offset level of the signal, the black level of the image signal changes due to the change of the offset level.

In other words, in the case of a "color read mode" or a "monochrome read mode", if the black level is constant at all times, a finished image is beautiful. However, if the read operation mode is changed, the black level of the output image changes, and the black density varies, thereby causing a problem in the finish of the output image.

SUMMARY OF THE INVENTION

It is an object of the present invention to at least partially solve the problems in the conventional technology.

According to an aspect of the present invention, an image reading apparatus includes a clamp-ratio controlling unit configured to change at least one of a clamp period and a line period for each read operation mode, wherein the clamp-ratio setting unit provides a control so that a clamp ratio that is a ratio between the clamp period and the line period is constant through all read operation modes.

According to another aspect of the present invention, an image processing apparatus includes an image reading apparatus that includes a clamp-ratio controlling unit configured to change at least one of a clamp period and a line period for each read operation mode, wherein the clamp-ratio setting unit provides a control so that a clamp ratio that is a ratio between the clamp period and the line period is constant through all read operation modes; and an image forming apparatus that forms an image on a recording medium based on image data read by the image reading apparatus.

According to another aspect of the present invention, a computer program product stores therein computer program that causes a computer to implement the above method The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings.

A first embodiment of the present invention is explained below with reference to FIGS. 1 to 10. The first embodiment is an example where a flatbed image scanner is applied as an image reading apparatus.

Figure 1:
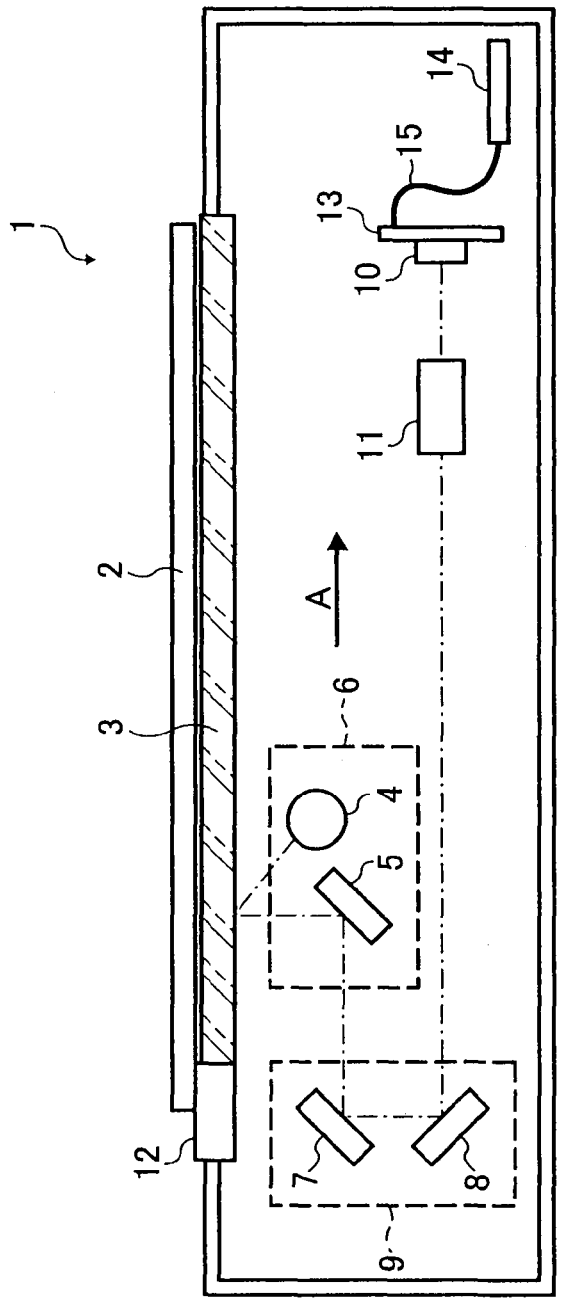
FIG. 1 is a longitudinal cross section of a schematic configuration of an image scanner according to a first embodiment of the present invention.

FIG. 1 is a longitudinal cross section of a schematic configuration of an image scanner 1 according to the first embodiment. As shown in FIG. 1, the image scanner 1 includes a contact glass 3 for mounting a document 2 thereon, a first carriage 6 including a halogen lamp 4 for exposing the document 2 and a first reflecting mirror 5, a second carriage 9 including a second reflecting mirror 7 and a third reflecting mirror 8, a charged coupled device (CCD) 10 as an image sensor, a lens unit 11 for forming an image on the CCD 10, and a white reference board 12 for shading correction. The CCD 10 is provided on a sensor board 13, and the sensor board 13 is connected to a signal processing board 14, on which a signal processing circuit (described later) for performing various types of signal processing with respect to an image signal output from the CCD 10 is mounted, via a connection cable 15. That is, the halogen lamp 4, the first reflecting mirror 5, the second reflecting mirror 7, and the third reflecting mirror 8, and the lens unit 11 constitute a scanning optical system. The scanning optical system can be a relative type in which mirrors and the like are fixed and the document is moved.

The halogen lamp 4 irradiates light at a certain angle relative to the white reference board 12 and a reading face of the contact glass 3, and the light reflected by the white reference board 12 or the document 2 enters into the CCD 10 via the first reflecting mirror 5, the second reflecting mirror 7, and the third reflecting mirror 8, and the lens unit 11. The CCD 10 outputs a voltage corresponding to the incident light amount as an analog image signal. The first carriage 6 and the second carriage 9 move in a sub scanning direction (a direction of arrow A), driven by a stepping motor (not shown), while keeping the distance between the read face of the document 2 and the CCD 10 constant, thereby exposing and scanning the document 2.

Figure 2:
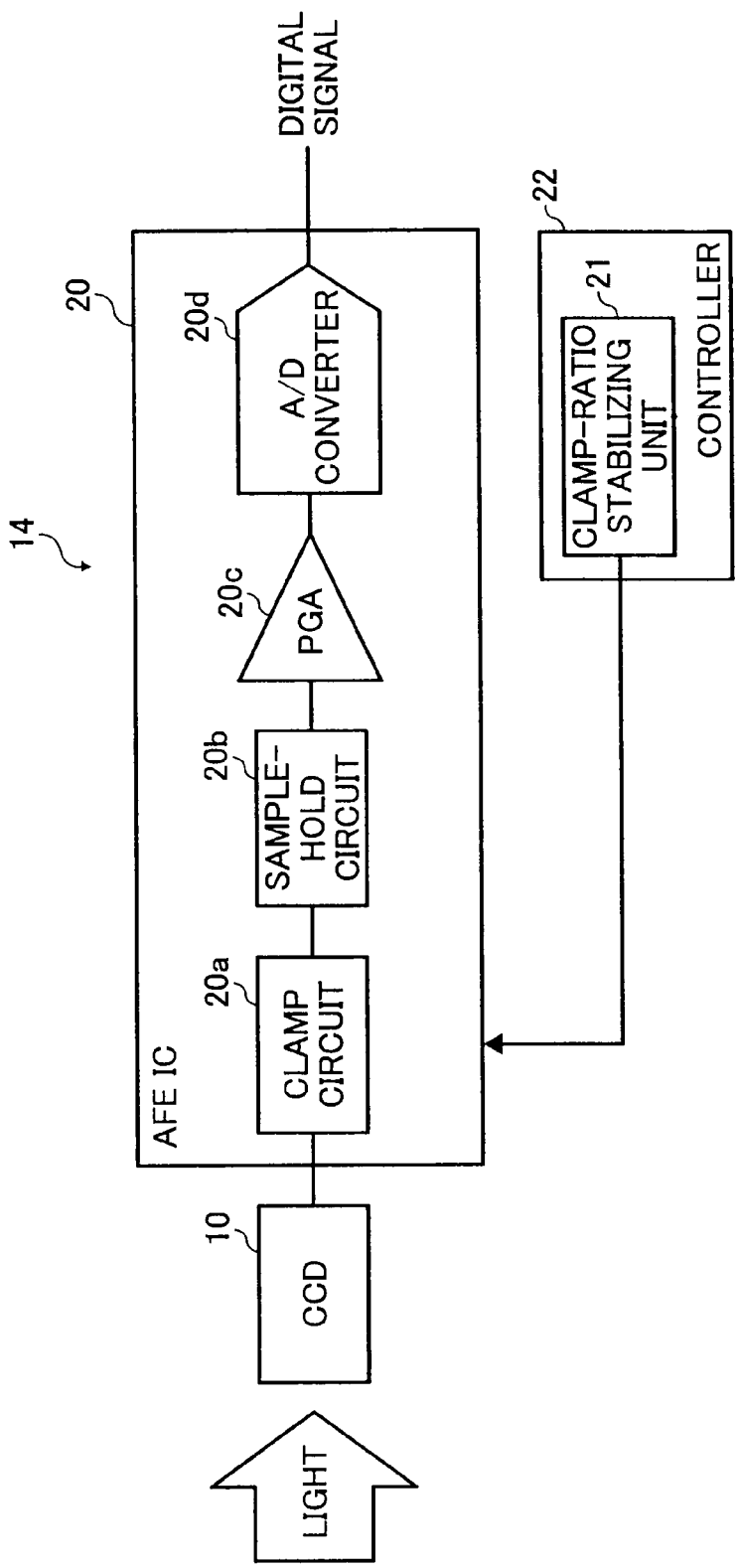
FIG. 2 is a schematic block diagram of a signal processing circuit mounted on a signal processing board.

FIG. 2 is a block diagram schematically depicting the signal processing circuit mounted on the signal processing board 14. As shown in FIG. 2, the signal processing circuit mounted on the signal processing board 14 includes an AFE IC 20 and a controller 22. The controller 22 includes a central processing unit (CPU) (not shown) and a memory, and includes various arithmetic processing functions performed by the operation of the CPU according to a program stored in the memory. In the first embodiment, the controller 22 includes a clamp-ratio stabilizing unit 21 as one of the arithmetic processing functions realized by the CPU according to the program. As described later in detail, the clamp-ratio stabilizing unit 21 realizes clamp-ratio stabilizing means.

The AFE IC 20 is explained first. The analog image signal output from the CCD 10 is input to the AFE IC 20. As one of the functions of the AFE IC 20, there is a function for performing a correction process by setting a black level value with respect to the analog image signal output from the CCD 10. More specifically, the analog signal output from the CCD 10 is subjected to a clamp processing for setting the black level to a constant by a clamp circuit 20a, a signal component is extracted by a sample-hold circuit 20b, and the extracted signal component is amplified by a programmable gain amplifier (PGA) 20c, and converted to digital data by an A/D converter 20d.

Figure 3:
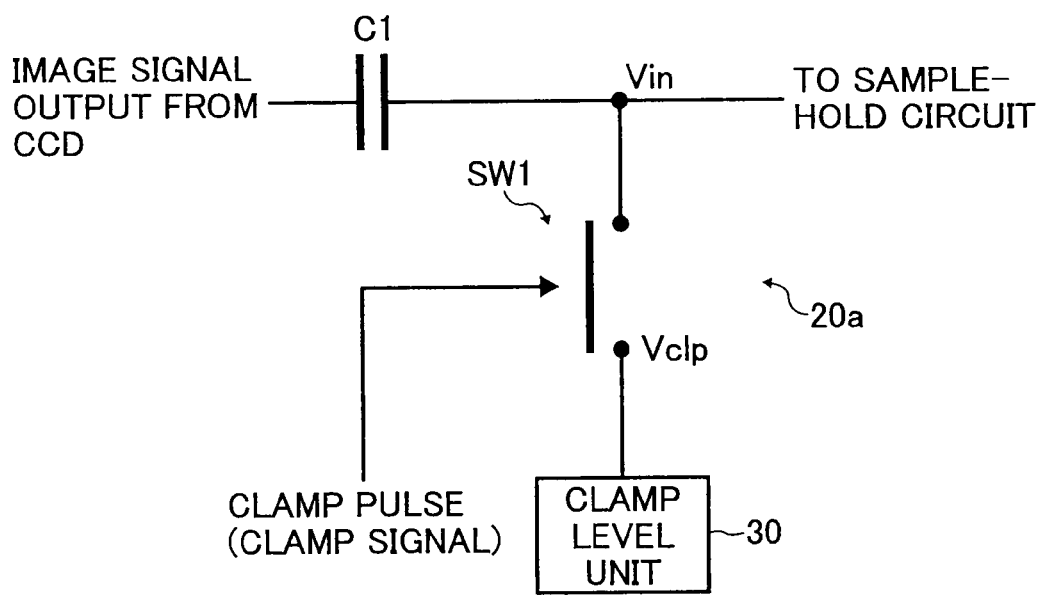
FIG. 3 is a circuit diagram of a configuration of a clamp circuit.

The clamp circuit 20a fixes the black level by keeping the potential in one line constant, and performs a black level correction process with respect to the output from the CCD 10 during the black pixel output period, based on the black level. More specifically, as shown in FIG. 3, when a clamp pulse (a clamp signal) is input (asserted), and a switch SW 1 is turned ON, an offset level Vin corresponding to the image signal output from the CCD is set as a clamp level Vclp for specifying the black level in a clamp level unit 30. In other words, the offset level Vin of an image signal output from the CCD is set to the clamp level Vclp in the clamp level unit 30, thereby keeping the potential constant.

Figure 4:
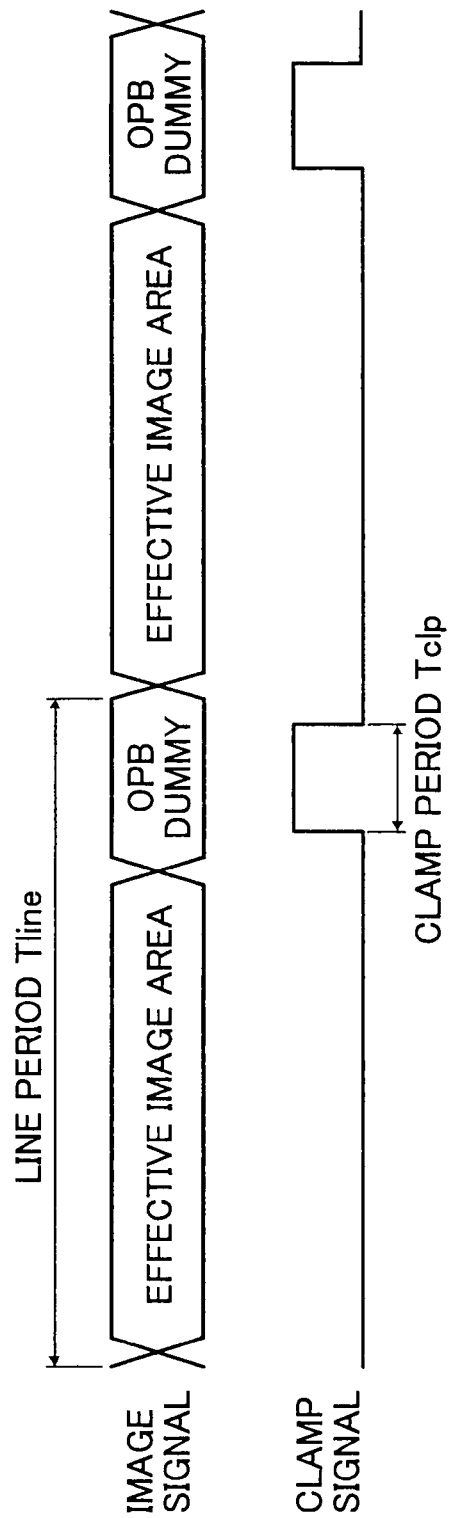
FIG. 4 is a timing chart of a relationship between an image signal and a clamp pulse.

FIG. 4 is a timing chart of a relationship between the image signal and the clamp pulse. As shown in FIG. 4, the clamp pulse (a clamp signal) is input (asserted) during a period other than an effective image area, that is, an optical black pixel period OPB and a dummy pixel period DUMMY. The input period of the clamp pulse is referred to as a clamp period Tclp. A period combining the effective image area, the optical black pixel period OPB, and the dummy pixel period DUMMY, that is a read period of one line in the vertical scanning direction is referred to as Tline.

Figure 5:
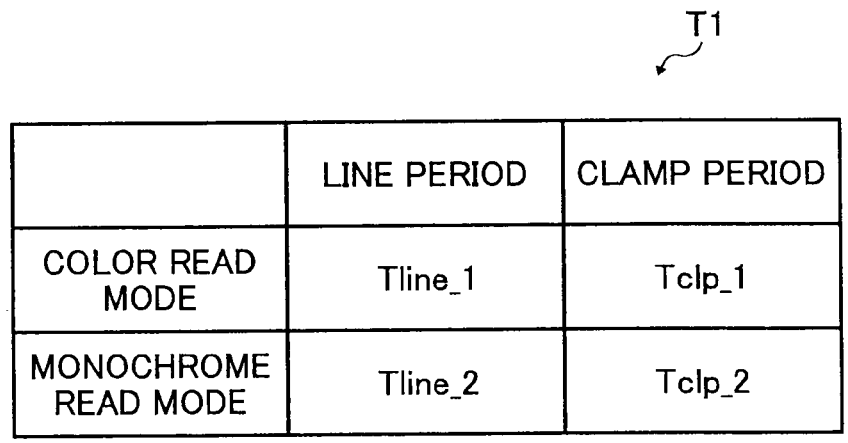
FIG. 5 is a table in which a clamp period and a line period are set for each read operation mode.

In the first embodiment, as shown in table T1 in FIG. 5, the clamp period Tclp and the line period Tline are respectively set to a different value for each read operation mode. The table T1 is stored in the memory of the controller 22 (the clamp-ratio stabilizing unit 21). Particularly, the reason why the line period Tline is set to a different value for each read operation mode is as described below. That is, in many cases, a copy speed is generally different for the color read mode and the monochrome read mode. When the copy speed is different for the color read mode and the monochrome read mode, the read speed of the image scanner 1 is changed for the color monochrome read mode according to the copy speed. In other words, the line period Tline relates to the read speed (requirement specification) of the image scanner 1, and needs to be changed matched with the read operation mode. From such a reason, the line period Tline is set to a different value for each read operation mode.

The reason why the clamp period Tclp is set to a different value for each read operation mode is explained below.

Figure 6:
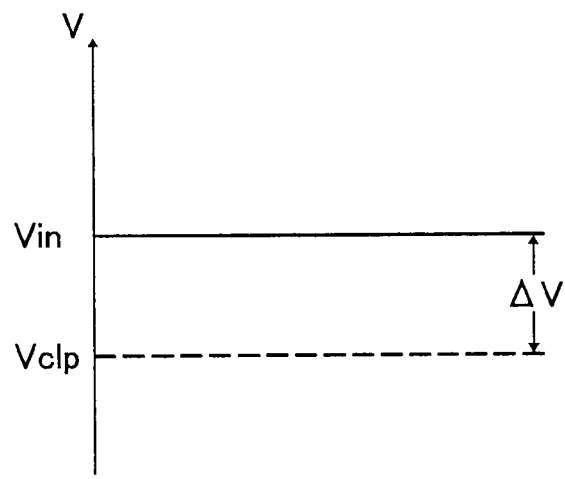
FIG. 6 is an explanatory diagram of a potential difference between Vin and Vclp.

In the clamp circuit 20a having such a configuration, the value of the clamp level Vclp may not be set to the offset level Vin due to some factors such as an on-resistance of the switch SW 1, and a leak current between an inside of the AFE IC 20 and the pad. In this case, a potential difference $\Delta V$ as shown in FIG. 6 is generated between the clamp level Vclp and the offset level Vin.

When the line period Tline is set to a different value for each of color and monochrome read operation modes as in the image scanner 1 in the first embodiment, the potential difference $\Delta V$ varies according to the read operation mode. When the clamp period Tclp is set to a different value for each of color and monochrome read operation modes, the potential difference $\Delta V$ varies according to the read operation mode. The variation of the potential difference $\Delta V$ accompanying the change of the read operation mode causes a change of the offset level of the image signal output from the CCD when the read operation mode is changed. Since the black level of the image signal output from the CCD is determined according to the offset level of the signal, the black level of the image signal varies according to the change of the offset level.

Figure 7:
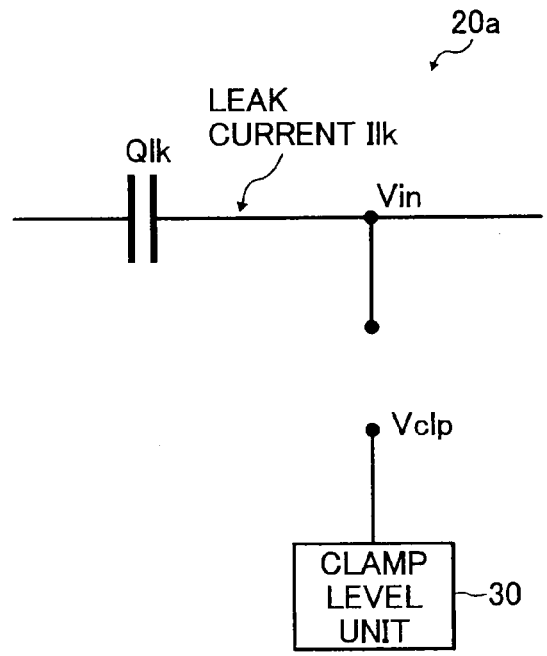
FIG. 7 is a circuit diagram of an equivalent circuit in a clamp circuit at the time of negating a clamp signal.
Figure 8:
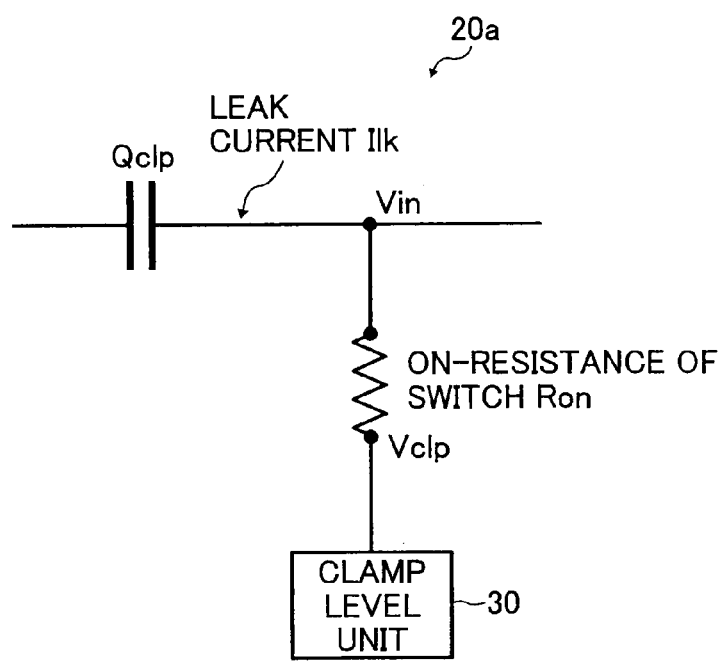
FIG. 8 is a circuit diagram of an equivalent circuit in the clamp circuit at the time of asserting a clamp signal.

Calculation of the potential difference ΔV is explained below. FIG. 7 is a circuit diagram of an equivalent circuit in the clamp circuit 20a at the time of negating the clamp signal, and FIG. 8 is a circuit diagram of the equivalent circuit in the clamp circuit 20a at the time of asserting the clamp signal. However, it is assumed that the on-resistance at the time of turning on the SW 1 is Ron, and the leak current flowing into the image signal is Ilk.

As shown in FIG. 7, when the electric charge charged by the leak current during the read period Tline of one line in the vertical scanning direction is Qlk, $$Qlk = Ilk \times Tline \quad (A)$$

Further, when a discharged charge current at the time of clamping is Qclp, $$Qclp = (Vin - Vclp)/Ron \times Tclp \quad (B).$$

When the charged current and the discharged current are equal and in a balanced state, the electric charge charged by the leak current Qlk and the discharged electric charge Qclp at the time of clamping match each other, and hence the following equation is established.

$$Qlk = Qclp$$

Therefore, in the balanced state, (A)=(B) is established.

$$Ilk \times Tline = (Vin - Vclp)/Ron \times Tclp$$

Accordingly, the potential difference ΔV can be calculated by the following equation.

$$\Delta V = (Vin - Vclp) = Ilk \times Ron \times Tline/Tclp \quad (1).$$

From equation (1), it is seen that when the line period Tline is set to a different value for each of the color monochrome read operation modes, ΔV changes. Further, it is seen that when the clamp period Tclp is set to a different value for each read operation mode, ΔV changes. This causes the change of the offset level of the image signal, when the read operation mode is changed.

The equation (1) can be expressed as:

$$\Delta V = Ilk \times Ron \times \alpha$$

That is, α is a ratio (clamp ratio) between the line period Tline and the clamp period Tclp.

The ratio between the line period and the clamp period corresponding to the read operation mode is:

$$\alpha M = TlineM/TclpM$$

M denotes respective read operation mode.

The value of the clamp ratio α varies according to the respective read operation modes (the color and monochrome read operation modes). In other words, if the value of the clamp ratio α does not vary, ΔV does not change.

In the first embodiment, therefore, the clamp-ratio stabilizing unit 21 maintains the value of the clamp ratio α so as not to change by stabilizing the voltage difference ΔV, which has conventionally changed for each read operation mode, through all read operation modes, thereby reducing variation of the black level. In other words, the clamp period Tclp is determined according to the relationship with the line period Tline, which has been preset for each read operation mode according to the read speed (requirement specification) of the image scanner 1 so that the clamp ratio α does not change for each read operation mode. This point is explained below in detail.

Figure 9:
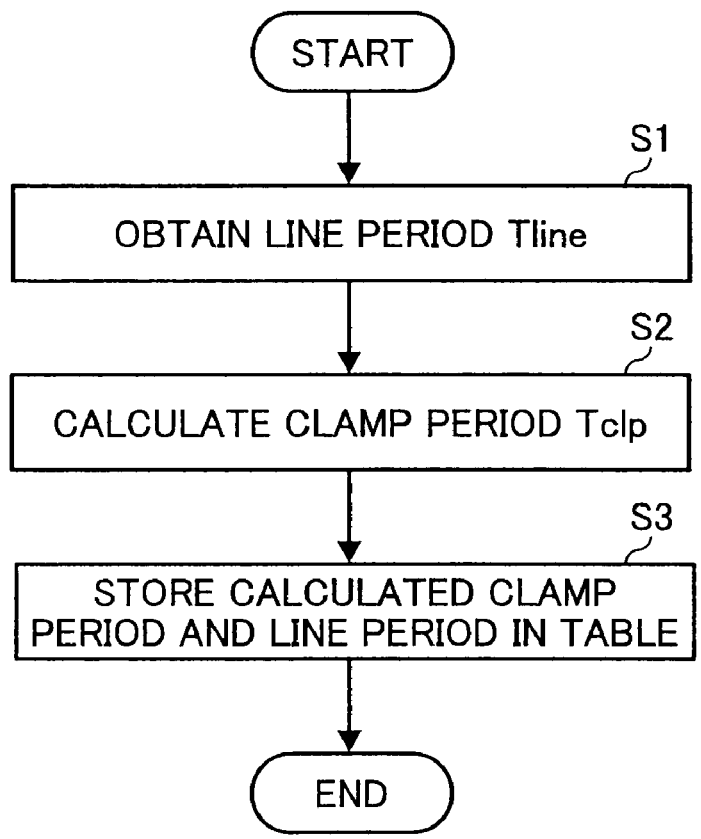
FIG. 9 is a flowchart of a clamp-ratio stabilizing process.

FIG. 9 is a flowchart of a clamp-ratio stabilizing process performed by the clamp-ratio stabilizing unit 21. The clamp-ratio stabilizing process is schematically a process for storing parameters (the clamp period Tclp and the line period Tline), which do not change the clamp ratio α for each read operation mode, in the table T1 beforehand before factory shipments. As shown in FIG. 9, the clamp-ratio stabilizing unit 21 obtains the line period Tline in the respective read operation modes predetermined in relation to the read speed (requirement specification) of the image scanner 1 from table T1 (step S1), calculates the clamp period Tclp in respective read operation modes (step S2), and stores the clamp period Tclp and the line period Tline in the table T1 (step S3).

Calculation of the clamp period Tclp in respective read operation modes at step S2 is explained below. Calculation of the clamp period Tclp in respective read operation modes is performed according to the following equations by predetermining the reference clamp ratio α.

$$Tclp\_1 = Tline\_1/\alpha$$

$$Tclp\_2 = Tline\_2/\alpha$$

Tline_1 denotes a line period in the color read mode, Tclp_1 denotes a clamp period in the color read mode, Tline_2 denotes a line period in the monochrome read mode, and Tclp_2 denotes a clamp period in the monochrome read mode.

In the above explanation, the line period Tline (Tline_1 and Tline_2) in respective read operation modes predetermined in relation to the read speed (requirement specification) of the image scanner are obtained from the table T1, and directly used for the calculation. However, the present embodiment is not limited thereto, and the clamp period Tclp (Tclp_1 and Tclp_2) can be calculated by changing Tline_1 and Tline_2, under a condition that the reference clamp ratio α does not change.

According to the first embodiment, by stabilizing the clamp ratio indicating the ratio between the clamp period and the line period through all read operation modes, the potential difference ΔV, which has been conventionally changing for each read operation mode, can be made constant through all read operation modes, thereby enabling reduction of variation of the black level. Accordingly, even if the read operation mode is changed, the black level of the output image can be kept constant.

A second embodiment of the present invention is explained below with reference to FIG. 10. Like reference letters refer to like parts as in the first embodiment, and redundant explanations thereof will be omitted. The second embodiment represents an application example to a digital copying machine 41 as the image processing apparatus.

Figure 10:
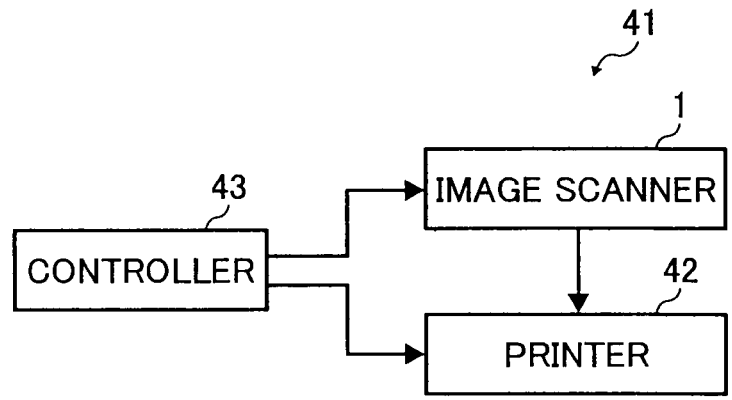
FIG. 10 is a block diagram of a schematic configuration of a digital copying machine according to a second embodiment of the present invention.
Figure 11:
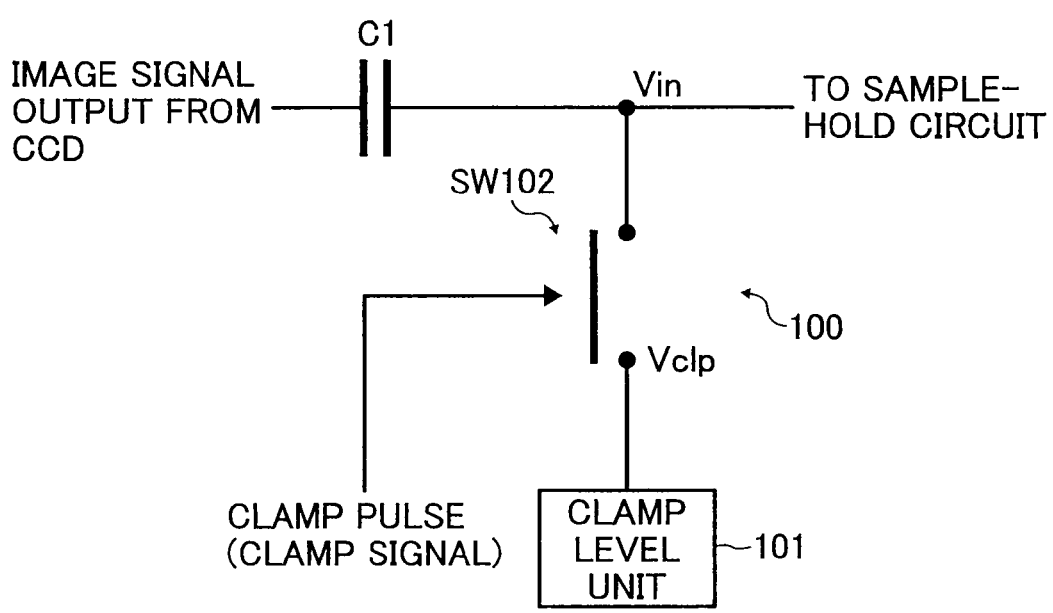
FIG. 11 is a circuit diagram of a configuration of the clamp circuit.

FIG. 10 is a block diagram of a schematic configuration of the digital copying machine 41 according to the second embodiment. The digital copying machine 41 includes the image scanner 1 having the configuration as shown in the first embodiment, a printer 42 as an image forming apparatus that forms an image on a sheet of paper based on digital image data read by the image scanner 1, and a controller 43 that controls the digital copying machine 41.

According to this configuration, by stabilizing the clamp ratio indicating the ratio between the clamp period and the line period through all read operation modes by the clamp-ratio stabilizing unit 21, digital image data is output to the printer 42, with the variation of the black level being reduced, a difference in the black density in the output image from the printer 42 can be prevented.

As the printing method of the printer 42, various methods such as an ink-jet method, a sublimation dye-transfer printing method, a silver-salt photographic method, a direct thermal-recording method, and a thermofusible transfer method can be used in addition to the electrophotographic method.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a controller having a clamp-ratio controlling unit configured to change at least one of a clamp period, corresponding to a time period during which a clamp signal is activated, and a line period, corresponding to a time period during which a read operation for a line is executed, for each read operation mode of a plurality of read operation modes,
wherein the clamp-ratio controlling unit provides a control so that a clamp ratio, that is a ratio between the clamp period and the line period, is constant throughout each of the plurality of read operation modes.

2. The image reading apparatus according to claim 1, wherein
the clamp period is a period for performing clamp processing for setting a black level to a constant, which is an absolute black reference of an analog image signal output according to a quantity of light at a time of receiving reflected light from a document, and
the line period is a read period of one line in a sub scanning direction.

3. The image reading apparatus according to claim 1, wherein the line period is preset for each of respective read operation modes, and the clamp-ratio controlling unit provides a control to keep constant the clamp ratio for each read operation mode by changing the clamp period.

4. The image reading apparatus according to claim 1, wherein the line period is preset for each of respective read operation modes, and the clamp-ratio controlling unit provides a control to keep constant the clamp ratio for each read operation mode by changing the clamp period and the line period.

5. An image processing system comprising:
an image reading apparatus that includes a clamp-ratio controlling unit configured to change at least one of a clamp period, corresponding to a time period during which a clamp signal is activated, and a line period, corresponding to a time period during which a read operation for a line is executed, for each read operation mode of a plurality of read operation modes, wherein the clamp-ratio controlling unit provides a control so that a clamp ratio, that is a ratio between the clamp period and the line period, is constant throughout each of the plurality of read operation modes; and
an image forming apparatus that forms an image on a recording medium based on image data read by the image reading apparatus.

6. The image processing system according to claim 5, wherein
the clamp period is a period for performing clamp processing for setting a black level to a constant, which is an absolute black reference of an analog image signal output according to a quantity of light at a time of receiving reflected light from a document, and
the line period is a read period of one line in a sub scanning direction.

7. The image processing system according to claim 5, wherein the line period is preset for each of respective read operation modes, and the clamp-ratio controlling unit provides a control to keep constant the clamp ratio for each read operation mode by changing the clamp period.

8. The image processing system according to claim 5, wherein the line period is preset for each of respective read operation modes, and the clamp-ratio controlling unit provides a control to keep constant the clamp ratio for each read operation mode by changing the clamp period and the line period.

9. A non-transitory computer readable medium having stored thereon a computer program product that when executed by a computer causes the computer to execute a method comprising:
controlling at least one of a clamp period, corresponding to a time period during which a clamp signal is activated, and a line period, corresponding to a time period during which a read operation for a line is executed, for each read operation mode of a plurality of read operation modes, wherein the controlling includes providing a control so that a clamp ratio, that is a ratio between the clamp period and the line period, is constant throughout each of the plurality of read operation modes.

10. The non-transitory computer readable medium according to claim 9, wherein
the clamp period is a period for performing clamp processing for setting a black level to a constant, which is an absolute black reference of an analog image signal output according to a quantity of light at a time of receiving reflected light from a document, and
the line period is a read period of one line in a sub scanning direction.

11. The non-transitory computer readable medium according to claim 9, wherein the line period is preset for each of respective read operation modes, and the controlling provides a control to keep constant the clamp ratio for each read operation mode by changing the clamp period.

12. The non-transitory computer readable medium according to claim 9, wherein the line period is preset for each of respective read operation modes, and the controlling provides a control to keep constant the clamp ratio for each read operation mode by changing the clamp period and the line period.

13. The image reading apparatus according to claim 1, wherein
the clamp period is calculated for each operation mode based on a reference clamp ratio and the line period, which is different for each operation mode.

* * * * *